(12) United States Patent
Fernandez-Corbaton et al.

(10) Patent No.: US 8,498,650 B2
(45) Date of Patent: Jul. 30, 2013

(54) SYSTEMS AND METHODS FOR ADAPTIVELY ALLOCATING RESOURCES BETWEEN A DEDICATED REFERENCE SIGNAL AND A TRAFFIC SIGNAL

(75) Inventors: Ivan Jesus Fernandez-Corbaton, San Diego, CA (US); Srikant Jayaraman, San Diego, CA (US); Charles Wheeler Sweet, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1979 days.

(21) Appl. No.: 10/728,680

(22) Filed: Dec. 5, 2003

(65) Prior Publication Data

US 2005/0124352 A1    Jun. 9, 2005

(51) Int. Cl.
  *H04W 72/00*  (2009.01)
  *H04B 7/00*   (2006.01)
(52) U.S. Cl.
  USPC .......... 455/452.2; 455/450; 455/522; 455/69; 455/70
(58) Field of Classification Search
  USPC ............... 455/452.2, 450, 452.1, 522, 69, 70
  See application file for complete search history.

(56) References Cited

U.S. PATENT DOCUMENTS

| | | | |
|---|---|---|---|
| 5,101,501 A | | 3/1992 | Gilhousen et al. |
| 5,479,444 A | * | 12/1995 | Malkamaki et al. .......... 375/231 |
| 5,606,580 A | * | 2/1997 | Mourot et al. ................ 375/340 |
| 6,724,815 B1 | * | 4/2004 | Jepsen et al. .................. 375/225 |
| 6,904,081 B2 | * | 6/2005 | Frank ........................... 375/152 |
| 2002/0102944 A1 | * | 8/2002 | Haim ............................... 455/70 |
| 2002/0154616 A1 | * | 10/2002 | Aoyama et al. ............... 370/335 |
| 2002/0168944 A1 | | 11/2002 | Terry et al. |
| 2003/0123406 A1 | * | 7/2003 | Yavuz et al. .................. 370/333 |

FOREIGN PATENT DOCUMENTS

| | | |
|---|---|---|
| EP | 0986282 A1 | 3/2000 |
| WO | WO 02/13448 | * 2/2002 |
| WO | WO 02/13448 A2 | * 2/2002 |

OTHER PUBLICATIONS

Chen, Guoan et al., "Adaptive channel estimation and dedicated pilot power adjustment based on the fading rate measurement for a pilot aided CDMA system", IEEE journal on selected areas in communications, vol. 19, No. 1, Jan. 2001.*
Assaad M.,et al., "On the Capacity of HSDPA" Globecom 03. 2003—IEEE Global Telecommunications Conference. Conference Proveedings. San Francisco, CA, Dec. 1-5, 2003 [IEE Global Telecommunications Conference]. New York, NY: IEE, US, vol. 1, Dec. 1, 2003, pp. 60-64, XP010677846 isbn:978-07803-79749.
European Search Report—EP08103247—Search Authority—Berlin—Jun. 5, 2008.
International Search Report and Written Opinion—PCT/US2004/040431—ISA/EPO—Jun. 4, 2005.

* cited by examiner

*Primary Examiner* — Christopher M Brandt
*Assistant Examiner* — Muthuswamy Manoharan
(74) *Attorney, Agent, or Firm* — Kevin Cheatham

(57) ABSTRACT

Systems and methods for adaptively allocating resources between a dedicated reference signal and a traffic signal are disclosed. In an exemplary embodiment, a wireless communication system 100 includes a base station 404. The base station 404 includes a receiver 428 that receives a quality metric 432 from a remote station 106. The quality metric 432 indicates the quality of a signal transmitted from the base station 404 and received by the remote station 106. The base station 404 also includes a resource allocation component 434 that uses the quality metric 432 to allocate a resource between the traffic signal 422 and the dedicated reference signal 418. The base station 404 also includes a transmitter 426 that transmits the traffic signal 422 and the dedicated reference signal 418 to the remote station 106.

32 Claims, 9 Drawing Sheets

SYSTEMS AND METHODS FOR ADAPTIVELY ALLOCATING RESOURCES BETWEEN A DEDICATED REFERENCE SIGNAL AND A TRAFFIC SIGNAL

BACKGROUND

1. Field

The present invention relates generally to wireless communications systems, and more specifically, to systems and methods for optimizing the data transmission capacity of wireless communication systems.

2. Background

The objective of a digital communications receiver is to recover the information sent by the transmitter. In most existing systems, the transmitter introduces a reference signal in the waveform together with the data-bearing signals. This reference signal, commonly referred to as a "pilot signal," is known a priori by the receiver and is used to increase the efficiency of the demodulation and decoding processes. It is common practice to broadcast the reference signal; in other words, all receivers will be using the same reference signal in their demodulation algorithms.

Since a part of the waveform is devoted to the transmission of the reference signal, the ceiling on system capacity for data transmission decreases as the amount of the reference signal increases. On the other hand, the receiver performance increases with the amount of the reference signal, which directly results in improved data capacity on given channel conditions.

One characteristic of a communication system that utilizes a reference signal is the tradeoff between the data capacity ceiling and the receiver efficiency that results from varying the portion of the waveform devoted to the transmission of the reference signal. Traditionally, the portion of the waveform devoted to the transmission of the reference signal is fixed and is chosen to be a good compromise, or optimization, between improving the receiver's performance and allocating a sufficient portion of the waveform for data transmission. This optimization is performed taking into account all possible channel conditions, which may vary greatly in propagation scenarios like the cellular environment. This leads to a solution which is good for the average case, but which may be far from optimal in extreme channel conditions.

Examples of systems designed to work on the cellular propagation environment are the CDMA standards for voice and data transmissions, cdma2000 and IS-856. It is a common characteristic of these systems to have dedicated traffic channels, i.e., portions of the waveform that are destined only to a particular user, where the information intended for that user is conveyed.

In view of the foregoing, benefits may be realized by systems and methods for improving the overall system capacity for data transmission.

SUMMARY

A method in a base station for adaptively allocating at least one resource between a traffic signal and a dedicated reference signal is disclosed. A quality metric is received from a remote station. The quality metric indicates the quality of a signal transmitted from the base station and received by the remote station. The quality metric is used to allocate a resource between the traffic signal and the dedicated reference signal. The dedicated reference signal and the traffic signal are transmitted to the remote station.

In some embodiments, the resource that is allocated between the traffic signal and the dedicated reference signal may be power. Alternatively, the resource may take the form of a time slot in a time-division multiplexed signal. Other examples of resources that may be allocated will be apparent to those skilled in the art in view of the teachings contained herein.

The method may also involve transmitting a common reference signal to the remote station and to a plurality of other remote stations. The quality metric may be a signal-to-interference-and-noise ratio of the common reference signal received at the remote station. Alternatively, the quality metric may take the form of a symbol error rate of the common reference signal received at the remote station. Alternatively still, the quality metric may take the form of a frame error rate of the common reference signal received at the remote station. Other examples of quality metrics will be apparent to those skilled in the art in view of the teachings contained herein.

A method in a remote station for facilitating adaptive allocation of at least one resource between a traffic signal and a dedicated reference signal is also disclosed. A common reference signal, a dedicated reference signal, and a traffic signal are received from a base station. A quality metric of the received common reference signal is determined. The quality metric is transmitted to the base station. The received common reference signal and the received dedicated reference signal are used to train a receiver at the remote station.

A base station that adaptively allocates at least one resource between a traffic signal and a dedicated reference signal is also disclosed. The base station includes a receiver that receives a quality metric from a remote station. The quality metric indicates the quality of a signal transmitted from the base station and received by the remote station. The base station also includes a resource allocation component that uses the quality metric to allocate a resource between the traffic signal and the dedicated reference signal. The base station also includes a transmitter that transmits the traffic signal and the dedicated reference signal to the remote station. In some embodiments, the transmitter may be further configured to transmit a common reference signal to the remote station and to a plurality of other remote stations.

A remote station configured to facilitate adaptive allocation of at least one resource between a traffic signal and a dedicated reference signal is also disclosed. The remote station includes a receiver that receives a common reference signal, a dedicated reference signal, and a traffic signal from a base station. The remote station also includes a signal quality measurement component that determines a quality metric of the received common reference signal. The remote station also includes a transmitter that transmits the quality metric to the base station. The remote station also includes a training component that uses the received common reference signal and the received dedicated reference signal to train the receiver.

DETAILED DESCRIPTION

Figure 1:
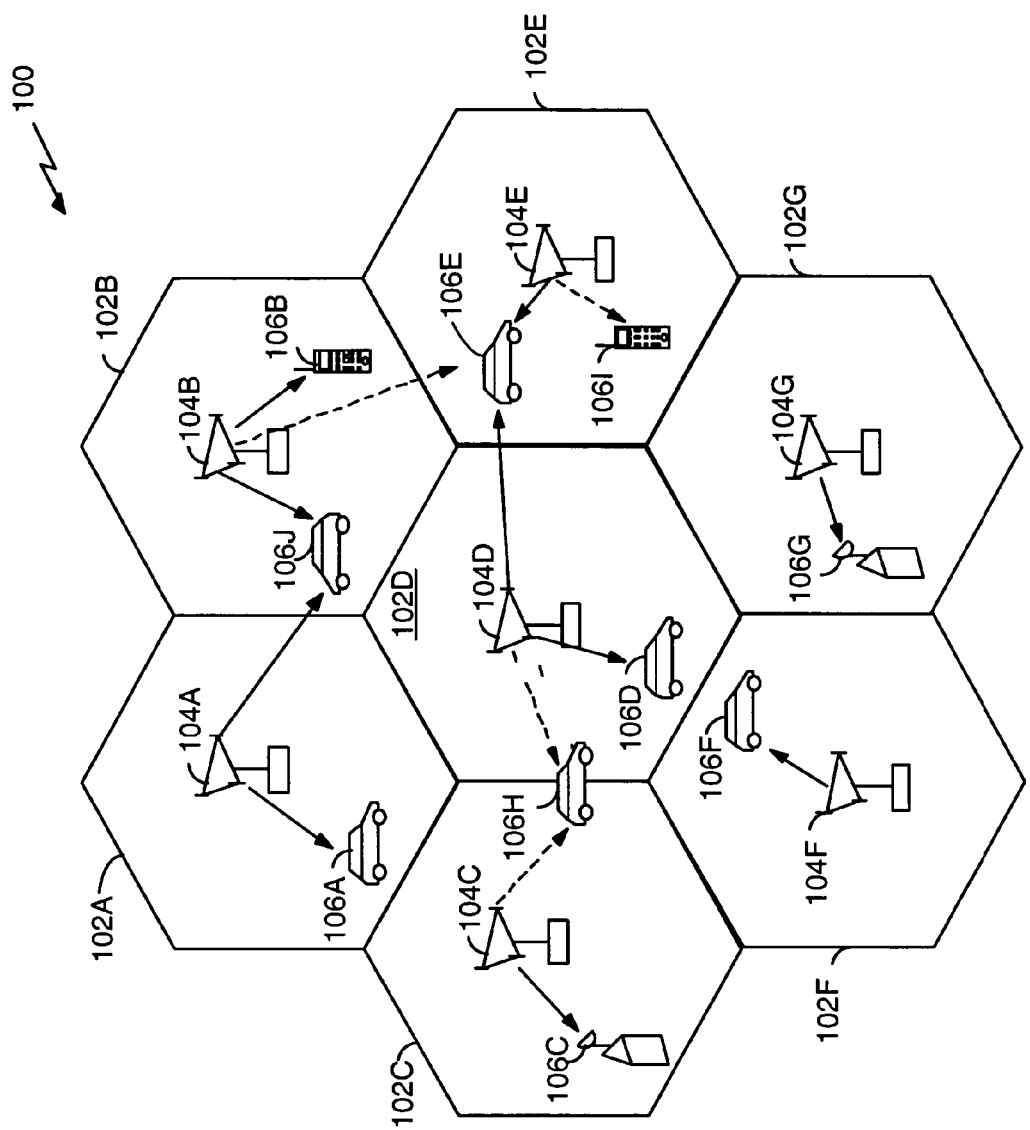
FIG. 1 illustrates an example of a communications system that supports a number of users and is capable of implementing at least some aspects of the embodiments discussed herein.

The word "exemplary" is used herein to mean "serving as an example, instance, or illustration." Any embodiment described herein as "exemplary" is not necessarily to be construed as preferred or advantageous over other embodiments.

Note that the exemplary embodiment is provided as an exemplar throughout this discussion, however, alternate embodiments may incorporate various aspects without departing from the scope of the present invention. Specifically, the present invention is applicable to a data processing system, a wireless communication system, a mobile IP network and any other system desiring to receive and process a wireless signal.

The exemplary embodiment employs a spread-spectrum wireless communication system. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A wireless communication system may be designed to support one or more standards such as the "TIA/EIAIIS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3GPP TS 25.211, 3GPP TS 25.212, 3GPP TS 25.213, and 3GPP TS 25.214, 3GPP TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

The systems and methods described herein may be used with high data rate (HDR) communication systems. An HDR communication system may be designed to conform to one or more standards such as the "cdma2000 High Rate Packet Data Air Interface Specification," 3GPP2 C.S0024, Version 2, Oct. 27, 2000, promulgated by the consortium "3rd Generation Partnership Project 2." The contents of the aforementioned standard are incorporated by reference herein.

An HDR subscriber station, which may be referred to herein as an access terminal (AT), may be mobile or stationary, and may communicate with one or more HDR base stations, which may be referred to herein as modem pool transceivers (MPTs). An access terminal transmits and receives data packets through one or more modem pool transceivers to an HDR base station controller, which may be referred to herein as a modem pool controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or landline phone. The communication link through which the access terminal sends signals to the modem pool transceiver is called a reverse link. The communication link through which a modem pool transceiver sends signals to an access terminal is called a forward link.

FIG. 1 illustrates an example of a communications system 100 that supports a number of users and is capable of implementing at least some aspects of the embodiments discussed herein. Any of a variety of algorithms and methods may be used to schedule transmissions in system 100. System 100 provides communication for a number of cells 102A-102G, each of which is serviced by a corresponding base station 104A-104G, respectively. In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Remote stations 106 in the coverage area may be fixed (i.e., stationary) or mobile. As shown in FIG. 1, various remote stations 106 are dispersed throughout the system. Each remote station 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and System for Providing a Soft Handoff in a CDMA Cellular Telephone System," which is assigned to the assignee of the present invention.

The downlink refers to transmission from the base station 104 to the remote station 106, and the uplink refers to transmission from the remote station 106 to the base station 104. In the exemplary embodiment, some of remote stations 106 have multiple receive antennas and others have only one receive antenna. In FIG. 1, base station 104A transmits data to remote, stations 106A and 106J on the downlink, base station 104B transmits data to remote stations 106B and 106J, base station 104C transmits data to remote station 106C, and so on.

Figure 2:
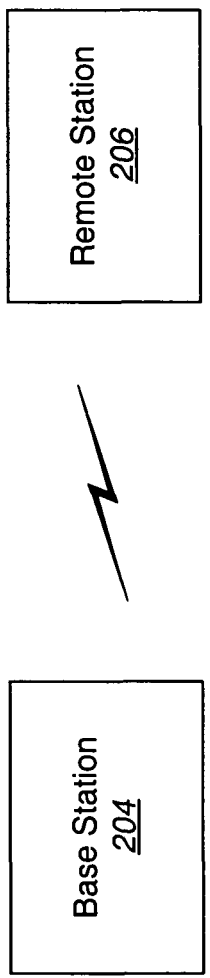
FIG. 2 is a block diagram of a base station and a remote station in a communications system.

FIG. 2 is a block diagram of a base station 204 and a remote station 206 in a wireless communication system 100. The base station 204 is in wireless communication with the remote station 206. As mentioned above, the base station 204 transmits signals to remote stations 206 that receive the signals. In addition, remote stations 206 may also transmit signals to the base station 204.

Figure 3:
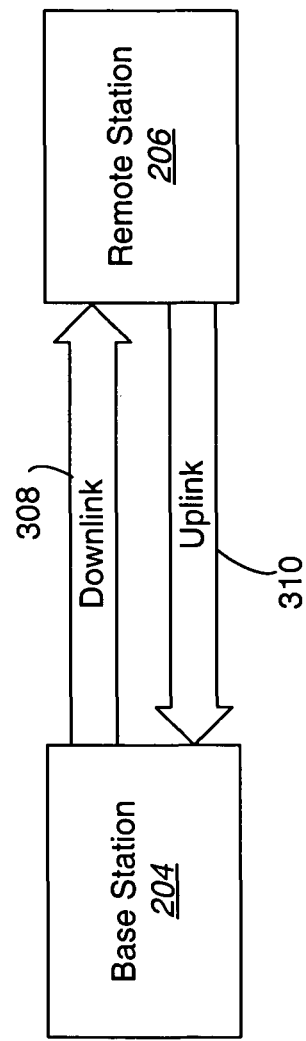
FIG. 3 is a block diagram of the base station and remote station illustrating a downlink and an uplink.

FIG. 3 is a block diagram of the base station 204 and remote station 206 illustrating the downlink 308 and the uplink 310. The downlink 308 refers to transmissions from the base station 204 to the remote station 206, and the uplink 310 refers to transmissions from the remote station 206 to the base station 204.

Figure 4:
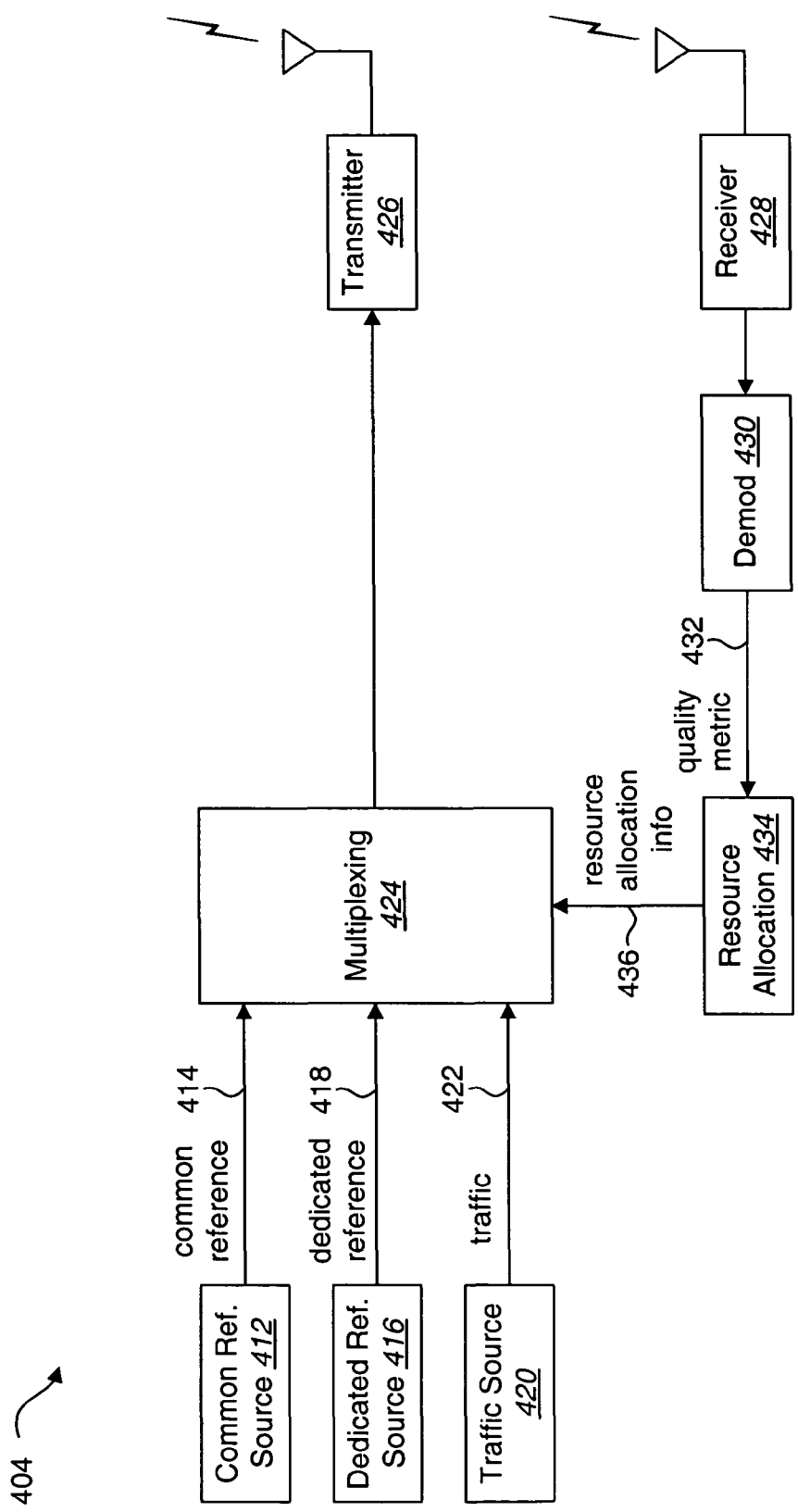
FIG. 4 is a functional block diagram illustrating an embodiment of a base station.

FIG. 4 is a functional block diagram illustrating an embodiment of a base station 404. The base station 404 includes a common reference source 412 that generates a common reference signal 414. The common reference signal 414 is often referred to as a common pilot signal 414. The base station 404 transmits the common reference signal 414 to all of the remote stations 106 within the communication system 100. The common reference signal 414 is an unmodulated, direct-sequence spread spectrum signal transmitted continuously by each base station 404. The common reference signal 414 is known a priori by each of the remote stations 106 in the communication system 100 and is used to increase the efficiency of the demodulation and decoding processes. The common reference signal 414 allows each user to acquire the timing of the channels transmitted by the base station 404, and provides a phase reference for coherent demodulation. The common reference signal 414 also provides a means for signal strength comparisons between base stations 404 to determine when to hand off between base stations 404 (such as when moving between cells 102).

The base station 404 also includes a dedicated reference source 416 that generates a dedicated reference signal 418. The dedicated reference signal 418 is similar to the common reference signal 414, except that the dedicated reference signal 418 is transmitted to a specific remote station 106 in the communication system 100. The dedicated reference signal 418 is known a priori by the remote station 106 that receives the dedicated reference signal 418. The dedicated reference signal 418 is used to increase the efficiency of the demodulation and decoding processes, as discussed above.

The base station 404 also includes a traffic source 420 that generates a traffic signal 422. The traffic signal 422 is a data-bearing signal other than the common reference signal 414 or the dedicated reference signal 418. The traffic signal 422 may include voice, data, overhead information, etc. Like the dedicated reference signal 418, the traffic signal 422 is transmitted to a specific remote station 106 in the communication system 100.

For simplicity, one dedicated reference source 416 and one traffic source 420 are illustrated in FIG. 4. However, those skilled in the art will recognize that a base station 404 may include more than one dedicated reference source 416 and/or traffic source 420. The base station 404 generates a separate dedicated reference signal 418 and a separate traffic signal 422 for each remote station 106 in the communication system 100.

A multiplexing component 424 multiplexes the common reference signal 414, the dedicated reference signal 418, and the traffic signal 422. The multiplexing component 424 may multiplex these signals in accordance with code division multiplexing techniques, time division multiplexing techniques, frequency division multiplexing techniques, and other techniques known to those skilled in the art, including combinations thereof. The output of the multiplexing component 424 is transmitted by a transmitter 426 to a remote station 106 in the communication system 100.

The base station 404 also includes a receiver 428. Signals received by the receiver 428 are demodulated by a demodulator 430. In some embodiments, a remote station 106 determines a quality metric 432 of the common reference signal 414 received at the remote station 106. The remote station 106 transmits this quality metric 432 to the base station 404. The quality metric 432 is recovered from the demodulated signal. Examples of different kinds of quality metrics 432 include the signal-to-interference-and-noise ratio (SINR), the symbol error rate, the frame error rate, etc. Other examples of quality metrics 432 will be apparent to those skilled in the art in view of the teachings contained herein.

In embodiments disclosed herein, the base station 404 allocates a fixed amount of at least one resource to transmission of the common reference signal 414. The base station 404 also allocates a fixed amount of the at least one resource to the combination of the dedicated reference signal 418 and the traffic signal 422. In other words, when the amount of a particular resource allocated to the dedicated reference signal 418 increases, the amount of that resource allocated to the traffic signal 422 decreases, and vice versa. Examples of different types of resources that may be allocated include power, a time slot in a time-division multiplexed signal, and so forth.

As discussed above, it is desirable to allocate resources so as to optimize the system capacity for transmitting the traffic signal 422. In some embodiments, this is accomplished by using the quality metric 432 received from the remote station 106 to determine the amount of resources that are devoted to transmission of the dedicated reference signal 418, so that the system capacity for transmitting the traffic signal 422 is maximized.

The base station 404 includes a resource allocation component 434 that uses the quality metric 432 received from the remote station 106 to determine how to allocate at least one resource between the dedicated reference signal 418 and the traffic signal 422. The resource allocation component 434 provides resource allocation information 436 to the multiplexing component 424. The multiplexing component 424 then allocates at least one resource between the dedicated reference signal 418 and the traffic signal 422 in accordance with the resource allocation information 436.

In some embodiments, determining how to allocate a resource between the dedicated reference signal 418 and the traffic signal 422 may be performed in the following manner. The quality metric 432 of the common reference signal 414 is a function of certain parameters. The resource allocation component 434 uses the received quality metric 432 to determine those parameters. The resource allocation component 434 then uses those parameters in a capacity function that expresses the transmission capacity of the downlink 308. The capacity function depends on the determined parameters and also on the portion of the resource devoted to the traffic signal 422. The portion of the resource devoted to the traffic signal 422 is then determined so as to maximize the capacity function. Additional details about how this may be accomplished, including mathematical equations illustrating this technique, will be provided below.

In some embodiments, the base station 404 does not initially transmit a dedicated reference signal 418 to the remote station 106. In other words, in some embodiments the multiplexing, component 424 initially allocates all of at least one resource (e.g., the amount of power allocated to the combination of the dedicated reference signal 418 and the traffic signal 422) to the traffic signal 422, and none of the at least one resource to the dedicated reference signal 418. Once the base station 404 begins to receive the quality metric 432 from the remote station 106, the resource allocation component 434 may then instruct the multiplexing component 424 to allocate some of the at least one resource to the dedicated reference signal 418 in order to optimize the system capacity for transmitting the traffic signal 422. Alternatively, in some embodiments the remote station 106 continuously reports the quality metric 432 measured over the common reference signal 418, and when the base station 404 needs to send information it does so already with the optimized resource allocation.

Figure 5:
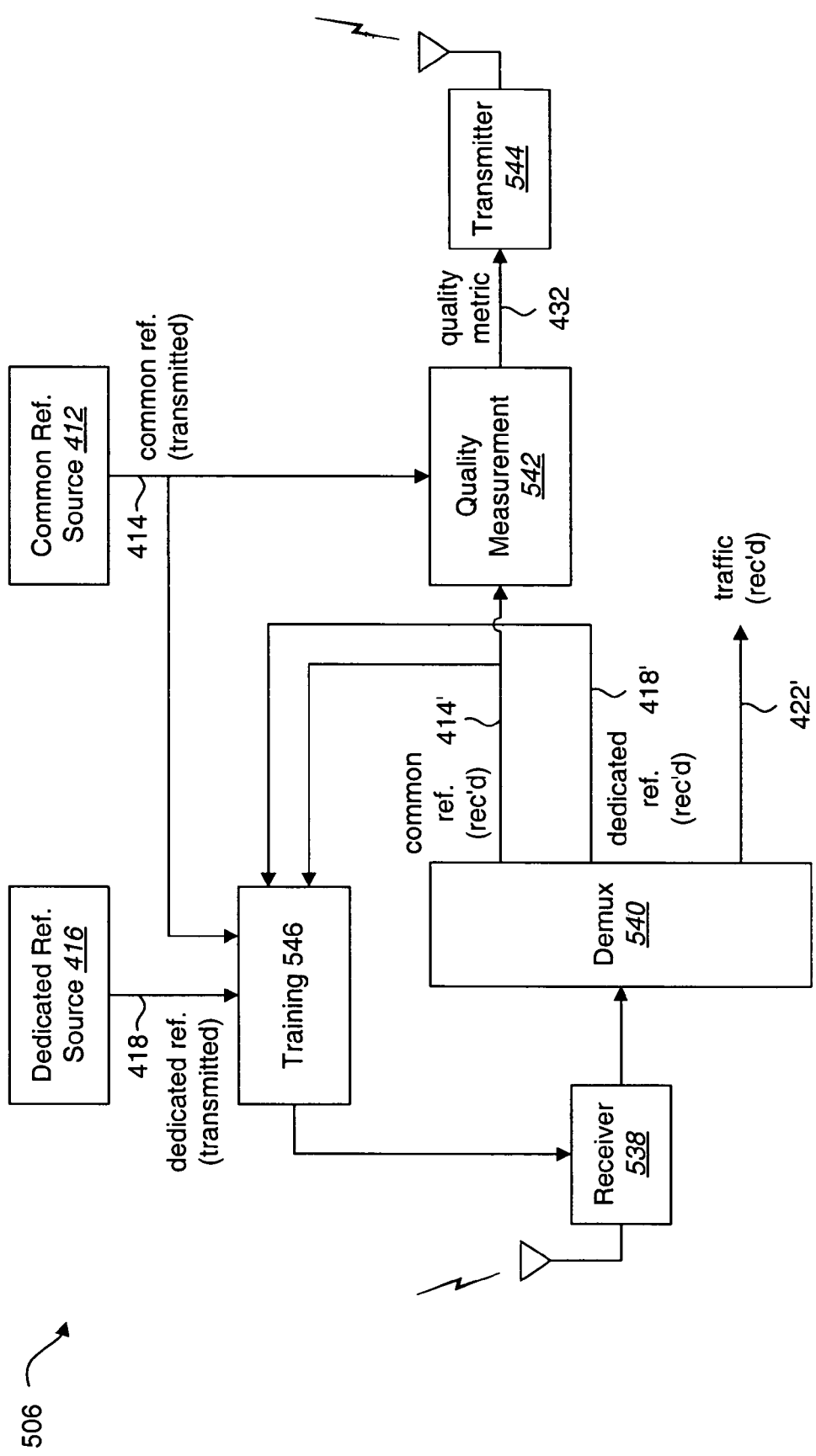
FIG. 5 is a functional block diagram illustrating an embodiment of a remote station.

FIG. 5 is a functional block diagram illustrating an embodiment of a remote station 506. The remote station 506 includes a receiver 538. A demultiplexing component 540 demultiplexes signals received by the receiver 538 in order to recover a received common reference signal 414', a received dedicated reference signal 418', and a received traffic signal 422'. The received common reference signal 414' is the version of the common reference signal 414 that is received at the remote station 506. The received dedicated reference signal 418' is the version of the dedicated reference signal 418 that is received at the remote station 506. The received traffic signal 422' is the version of the traffic signal 422 that is received at the remote station 506.

As discussed above, the common reference signal 414 and the dedicated reference signal 418 that are transmitted by the base station 404 are known a priori by the remote station 506. In the illustrated embodiment, the remote station 506 includes a common reference source 412 and a dedicated reference source 416. The common reference source 412 generates a copy of the common reference signal 414 transmitted by the base station 404. This will be referred to as the transmitted common reference signal 414. The dedicated reference source 416 generates a copy of the dedicated reference signal 418 transmitted by the base station 404. This will be referred to as the transmitted dedicated reference signal 418.

The received common reference signal 414' and the transmitted common reference signal 414 are provided to a signal quality measurement component 542. The signal quality measurement component 542 determines a quality metric 432 of the received common reference signal 414'. As discussed previously, examples of different types of quality metrics 432 include the SINR, the symbol error rate, the frame error rate, etc. The quality metric 432 is provided to a transmitter 544, which transmits the quality metric 432 to the base station 404.

The received common reference signal 414', the received dedicated reference signal 418', the transmitted common reference signal 414, and the transmitted dedicated reference signal 418 are each provided to a training component 546. The training component 546 compares the received reference signals (the received common reference signal 414' and the received dedicated reference signal 418') with the transmitted reference signals (the transmitted common reference signal 414 and the transmitted dedicated reference signal 418). Based on this comparison, the training component 546 "trains" the receiver 538 to compensate for signal distortions that may have resulted from noise, interference, and the like during transmission. In one embodiment the receiver 538 includes a filter (not shown), and the training component 546 determines the coefficients for the taps of the filter. To determine the coefficients for the taps of the filter, the training component 546 may utilize known adaptive algorithms such as least mean square (LMS), recursive least squares (RLS), etc.

Figure 6:
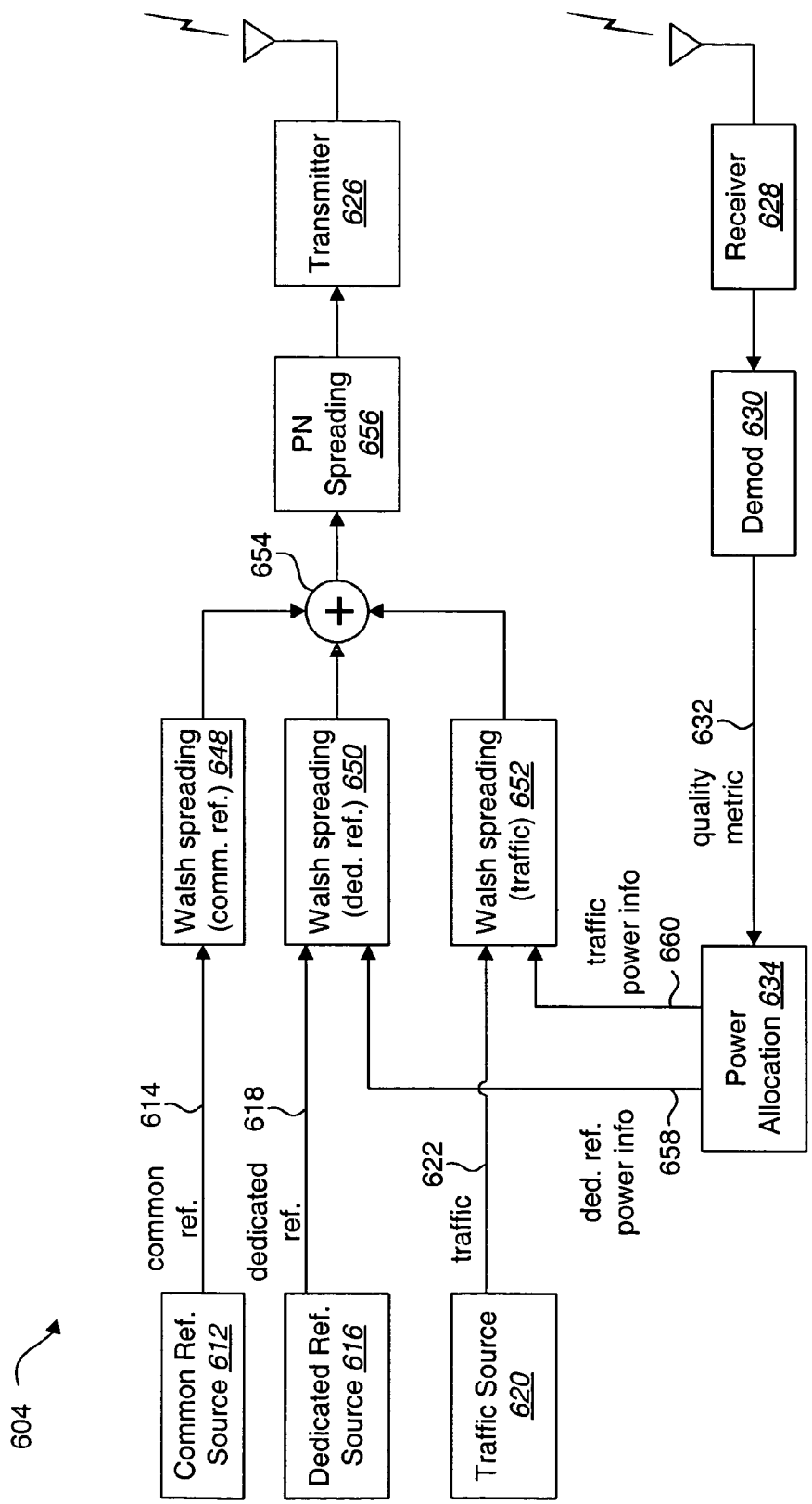
FIG. 6 is a functional block diagram illustrating another embodiment of a base station.

FIG. 6 is a functional block diagram illustrating another embodiment of a base station 604. Like the embodiment described previously, the base station 604 includes a common reference source 612 that generates a common reference signal 614, a dedicated reference source 616 that generates a dedicated reference signal 618, and a traffic source 620 that generates a traffic signal 622.

In the illustrated embodiment, the common reference signal 614, dedicated reference signal 618, and traffic signal 622 are multiplexed in accordance with a code-division multiplexing technique. The base station 604 includes a Walsh spreading component 648 for the common reference signal 614, a Walsh spreading component 650 for the dedicated reference signal 618, and a Walsh spreading component 652 for the traffic signal 622. The common reference Walsh spreading component 648 spreads the common reference signal 614 with a Walsh code that is assigned to the common reference signal 614. The dedicated reference Walsh spreading component 650 spreads the dedicated reference signal 618 with a Walsh code that is assigned to the dedicated reference signal 618 for a specific remote station 106. The traffic Walsh spreading component 652 spreads the traffic signal 622 with a Walsh code that is assigned to the traffic signal 622 for the specific remote station 106.

The outputs of the common reference Walsh spreading component 648, the dedicated reference Walsh spreading component 650, and the traffic Walsh spreading component 652 are combined by a combiner 654. The output of the combiner 654 is spread with a PN code by PN spreading component 656. The output of the PN spreading component 656 is transmitted to the remote station 106 by the transmitter 626.

As in the embodiment described previously, the base station 604 includes a receiver 628 and a demodulator 630. Signals received by the receiver 628 are demodulated by the demodulator 630. The remote station 106 determines a quality metric 632 of the common reference signal 614 received at the remote station 106 and transmits this quality metric 632 to the base station 604. The quality metric 632 is recovered from the demodulated signal.

The base station 604 also includes a resource allocation component 634. In the base station 604 shown in FIG. 6, the resource allocation component 634 is embodied as a power allocation component 634. The power allocation component 634 uses the quality metric 632 in order to determine how to allocate power between the dedicated reference signal 618 and the traffic signal 622 in order to maximize the system capacity for transmitting the traffic signal 622. Specific examples of how this determination may be made will be discussed below.

The power allocation component 634 provides dedicated reference power information 658 to the dedicated reference Walsh spreading component 650. The dedicated reference Walsh spreading component 650 uses the dedicated reference power information 658 to allocate power to the Walsh code that it uses to spread the dedicated reference signal 618.

The power allocation component 634 provides traffic power information 660 to the traffic Walsh spreading component 652. The traffic Walsh spreading component 652 uses the traffic power information 660 to allocate power to the Walsh code that it uses to spread the traffic signal 622. Power is allocated to a Walsh code by means of a multiplicative factor that scales the digital signal corresponding to the particular Walsh code. At a later stage, the digital signals corresponding to all active Walsh codes are added together to form the total digital signal ready for transmission.

Figure 7:
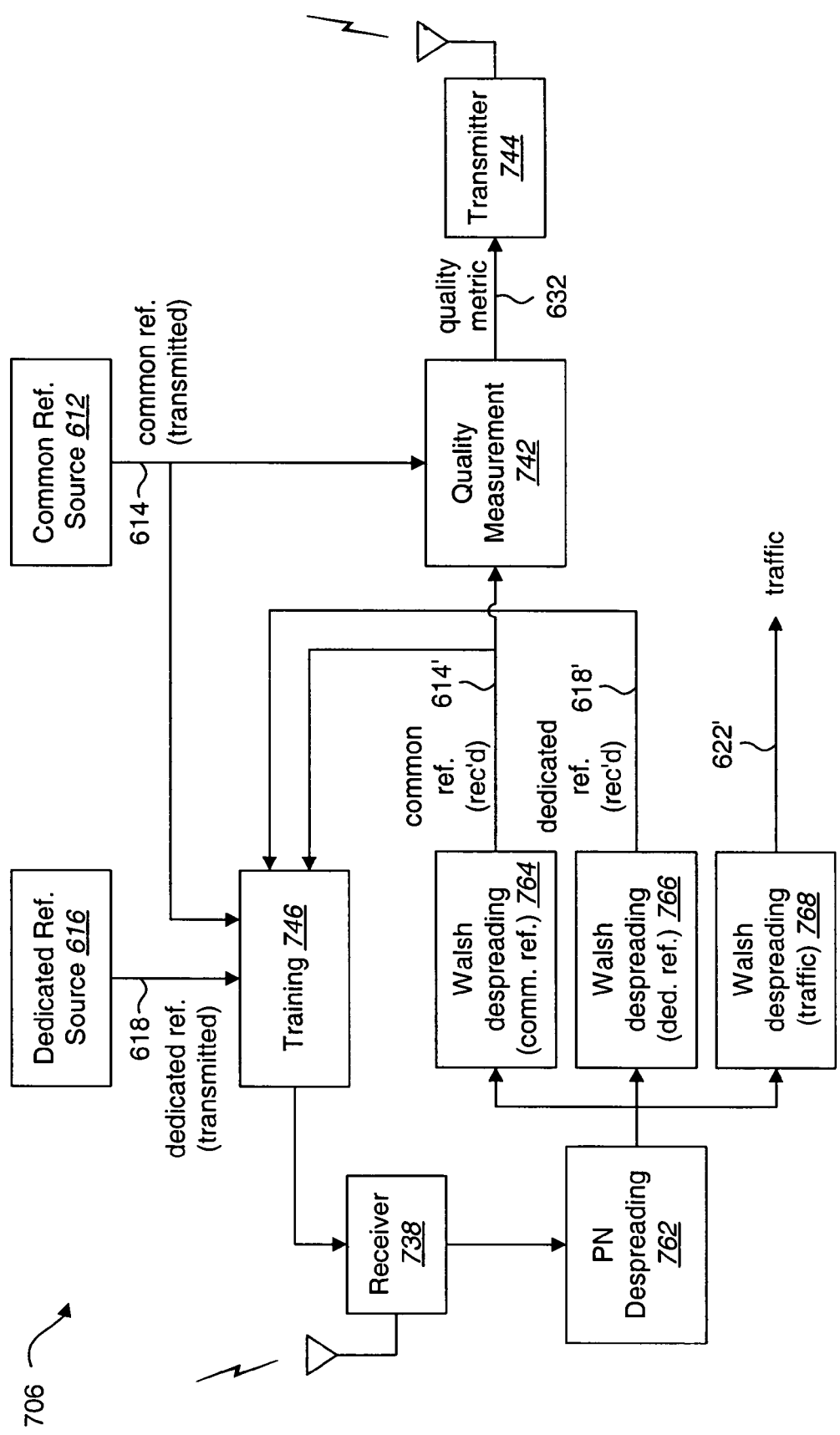
FIG. 7 is a functional block diagram illustrating another embodiment of a remote station.

FIG. 7 is a functional block diagram illustrating another embodiment of a remote station 706. As in the embodiment described previously, the remote station 706 includes a receiver 738. A PN despreading component 762 despreads the signals received by the receiver 738. The output of the PN despreading component 762 is provided to a common reference Walsh despreading component 764, a dedicated reference Walsh despreading component 766, and a traffic Walsh despreading component 768.

The common reference Walsh despreading component 764 despreads the output of the PN despreading component 762 with the Walsh code that is assigned to the common reference signal 614, thereby recovering the received common reference signal 614'. The dedicated reference Walsh despreading component 766 despreads the output of the PN despreading component 762 with the Walsh code that is assigned to the dedicated reference signal 618 for the remote station 706, thereby recovering the received dedicated reference signal 618'. The traffic Walsh despreading component 768 despreads the output of the PN despreading component 762 with the Walsh code that is assigned to the traffic signal 622 for the remote station 706, thereby recovering the received traffic signal 622'.

As in the embodiment described previously, the remote station 706 also includes a common reference source 612 that generates a transmitted common reference signal 614 and a dedicated reference source 616 that generates a transmitted dedicated reference signal 618. The transmitted common reference signal 614 is identical to the common reference signal 614 sent from the base station 604. Similarly, the transmitted dedicated reference signal 618 is identical to the dedicated reference signal 618 sent from the base station 604.

The received common reference signal 614' and the transmitted common reference signal 614 are provided to a signal quality measurement component 742. The quality measurement component 742 determines a quality metric 632 of the received common reference signal 614'. As discussed previously, examples of different types of quality metrics 632 include the SINR, the symbol error rate, the frame error rate, etc. The quality metric 632 is provided to a transmitter 744, which transmits the quality metric 632 to the base station 604.

The received common reference signal 614', the received dedicated reference signal 618', the transmitted common reference signal 614, and the transmitted dedicated reference signal 618 are each provided to a training component 746. The training component 746 compares the received reference signals (the received common reference signal 614' and the received dedicated reference signal 618') with the transmitted reference signals (the transmitted common reference signal 614 and the transmitted dedicated reference signal 618). As discussed previously, the training component 746 "trains" the receiver 738 to compensate for signal distortions that may result from noise, interference, and so forth during transmission.

Figure 8:
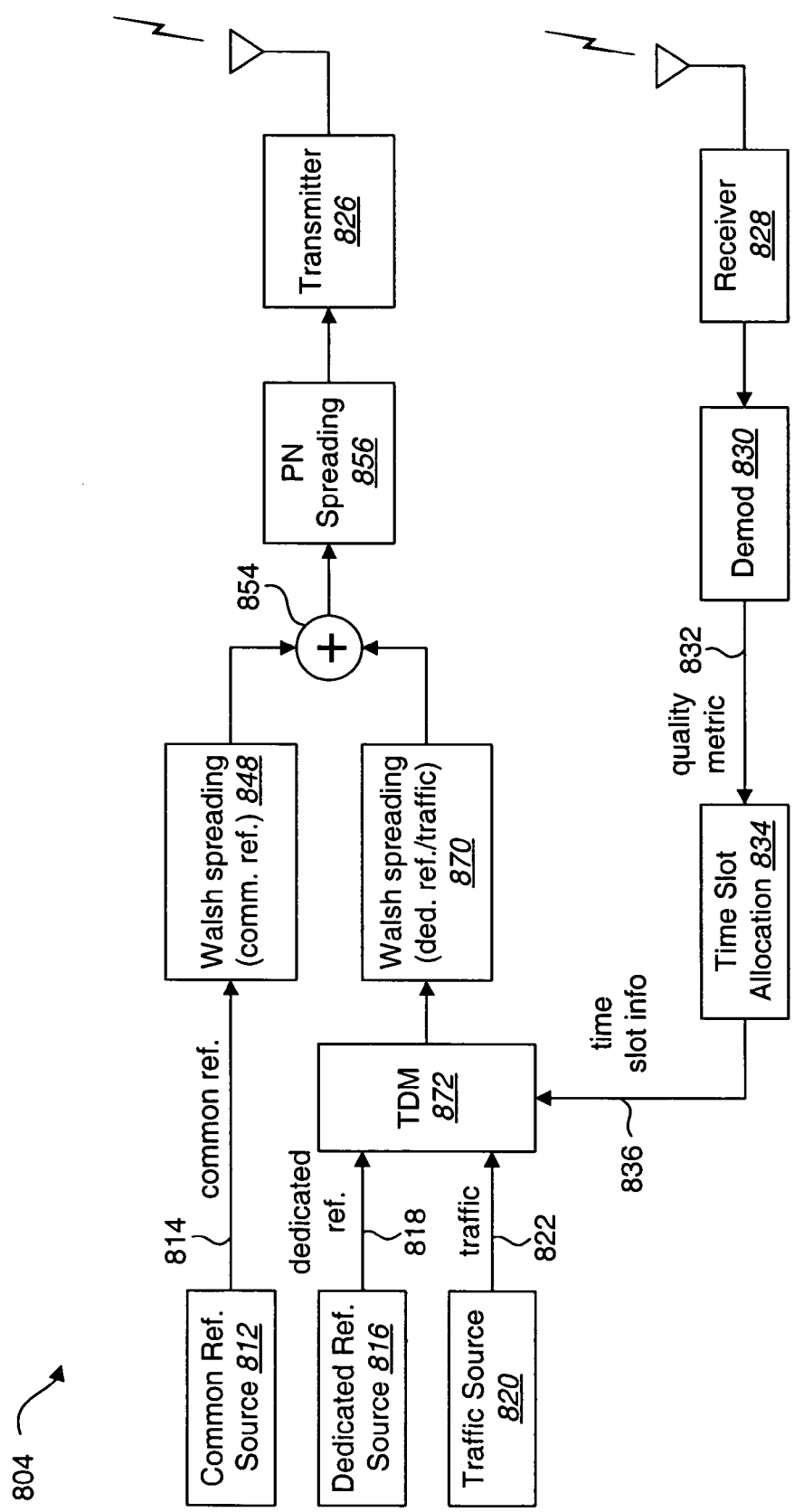
FIG. 8 is a functional block diagram illustrating another embodiment of a base station.

FIG. 8 is a functional block diagram illustrating another embodiment of a base station 804. Like the embodiments described previously, the base station 804 includes a common reference source 812 that generates a common reference signal 814, a dedicated reference source 816 that generates a dedicated reference signal 818, and a traffic source 820 that generates a traffic signal 822. The base station 804 uses a quality metric 832 received from a remote station to determine how to allocate a resource between the dedicated reference signal 818 and the traffic signal 822 in order to maximize the system capacity for transmitting the traffic signal 822 to the remote station. In the illustrated embodiment, the resource is a time slot in a time-division multiplexed signal.

The base station 804 includes a Walsh spreading component 848 for the common reference signal 814, and a Walsh spreading component 870 for the combination of the dedicated reference signal 818 and the traffic signal 822. The base station 804 also includes a time-division multiplexing (TDM) component 872.

The common reference Walsh spreading component 848 spreads the common reference signal 814 with a Walsh code that is assigned to the common reference signal 814. The TDM component 872 time-division multiplexes the dedicated reference signal 818 with the traffic signal 822. The dedicated reference/traffic Walsh spreading component 870 spreads the output of the TDM component 872 with a Walsh code that is assigned to the combination of the dedicated reference signal 818 and the traffic signal 822 for a specific remote station 106.

The outputs of the common reference Walsh spreading component 848 and the dedicated reference/traffic Walsh spreading component 870 are combined by the combiner 854. The output of the combiner 854 is spread with a PN code by PN spreading component 856. The output of the PN spreading component 856 is transmitted to the remote station 106 by the transmitter 826.

As in the embodiments described previously, the base station 804 includes a receiver 828 and a demodulator 830. Signals received by the receiver 828 are demodulated by the demodulator 830. The remote station 106 determines a quality metric 832 of the common reference signal 814 received at the remote station 106 and transmits this quality metric 832 to the base station 804. The quality metric 832 is recovered from the demodulated signal.

In the base station 804 shown in FIG. 8, the resource allocation component 834 is embodied as a time slot allocation component 834. The time slot allocation component 834 uses the quality metric 832 in order to determine how to allocate an available time slot between the dedicated reference signal 818 and the traffic signal 822 in order to maximize the system capacity for transmitting the traffic signal 822. Specific examples of how this determination may be made will be discussed below.

The time slot allocation component 834 provides time slot information 836 to the TDM component 872. The TDM component 872 uses the time slot information 836 during time-division multiplexing of the dedicated reference signal 818 and the traffic signal 822. More specifically, the TDM component 872 uses the time slot information 836 to allocate the length of the time slot for the dedicated reference signal 818 and the length of the time slot for the traffic signal 822 in a time-division multiplexed signal generated by the TDM component 872.

Figure 9:
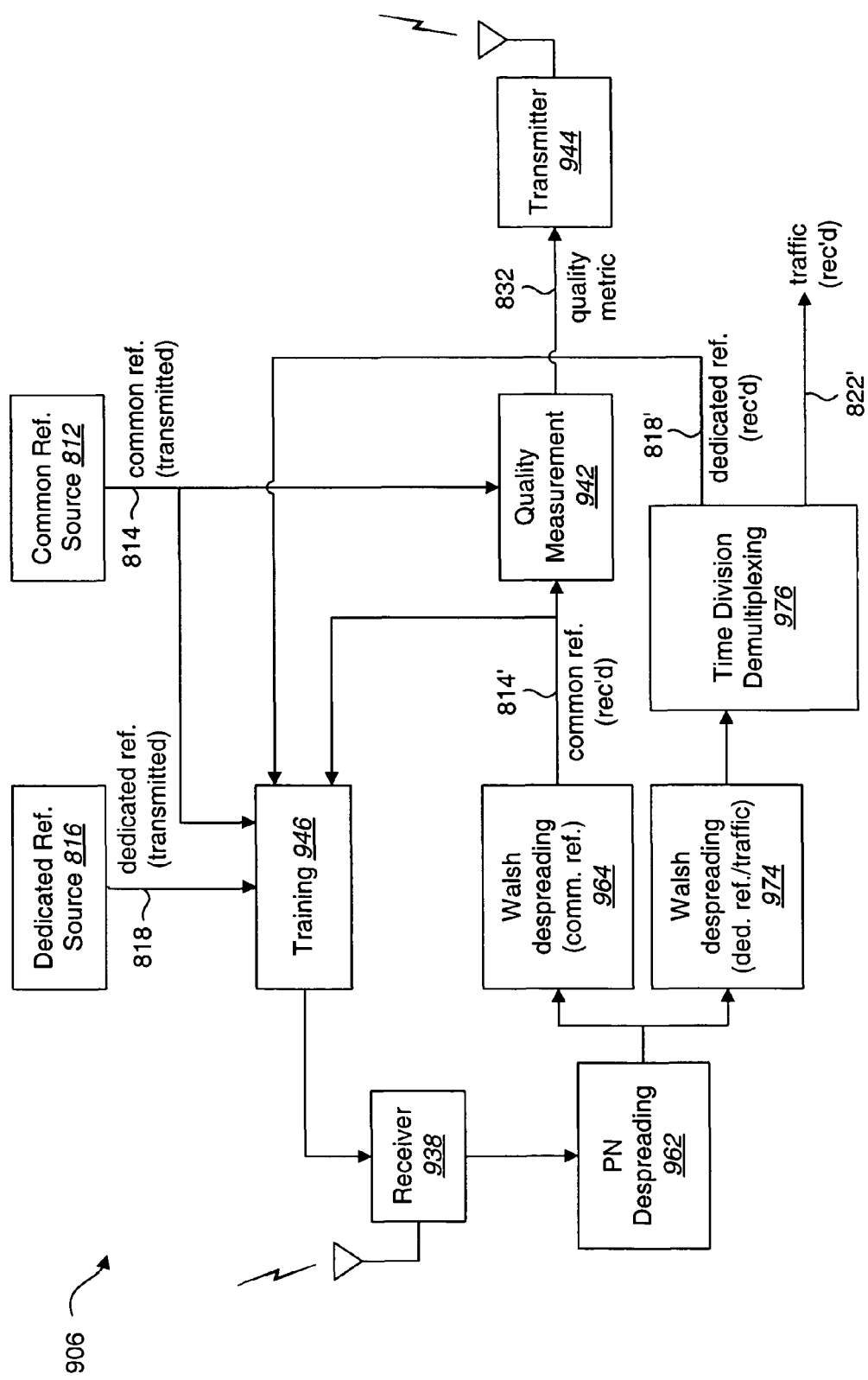
FIG. 9 is a functional block diagram illustrating another embodiment of a remote station.

FIG. 9 is a functional block diagram illustrating another embodiment of a remote station 906. As in the embodiment described previously, the remote station 906 includes a receiver 938. A PN despreading component 962 despreads the signals received by the receiver 938. The output of the PN despreading component 962 is provided to a common reference Walsh despreading component 964 and a dedicated reference/traffic Walsh despreading component 974.

The common reference Walsh despreading component 964 despreads the output of the PN despreading component 962 with the Walsh code that is assigned to the common reference signal 814, thereby recovering the received common reference signal 814'. The dedicated reference/traffic Walsh despreading component 974 despreads the output of the PN despreading component 962 with the Walsh code that is assigned to the combination of the dedicated reference signal 818 and the traffic signal 822 for the remote station 906. The output of the dedicated reference/traffic Walsh despreading component 974 is time-division demultiplexed by a time-division demultiplexing component 976, thereby recovering the received dedicated reference signal 818' and the received traffic signal 822'.

As in the embodiments described previously, the remote station 906 also includes a common reference source 812 that generates a transmitted common reference signal 814 and a dedicated reference source 816 that generates a transmitted dedicated reference signal 818. The transmitted common reference signal 814 is identical to the common reference signal 814 sent from the base station 804. Similarly, the transmitted dedicated reference signal 818 is identical to the dedicated reference signal 818 sent from the base station 804.

The received common reference signal 814' and the transmitted common reference signal 814 are provided to a signal quality measurement component 942. The signal quality measurement component 942 determines a quality metric 832 of the received common reference signal 814'. As discussed previously, examples of different types of quality metrics 832 include the SINR, the symbol error rate, the frame error rate, etc. The quality metric 832 is provided to a transmitter 944, which transmits the quality metric 832 to the base station 804.

The received common reference signal 814', the received dedicated reference signal 818', the transmitted common reference signal 814, and the transmitted dedicated reference signal 818 are each provided to a training component 946. The training component 946 compares the received reference signals (the received common reference signal 814' and the received dedicated reference signal 818') with the transmitted reference signals (the transmitted common reference signal 814 and the transmitted dedicated reference signal 818). As discussed previously, the training component 946 "trains" the receiver 938 to compensate for signal distortions that may result from noise, interference, and so forth during transmission.

Figure 10:
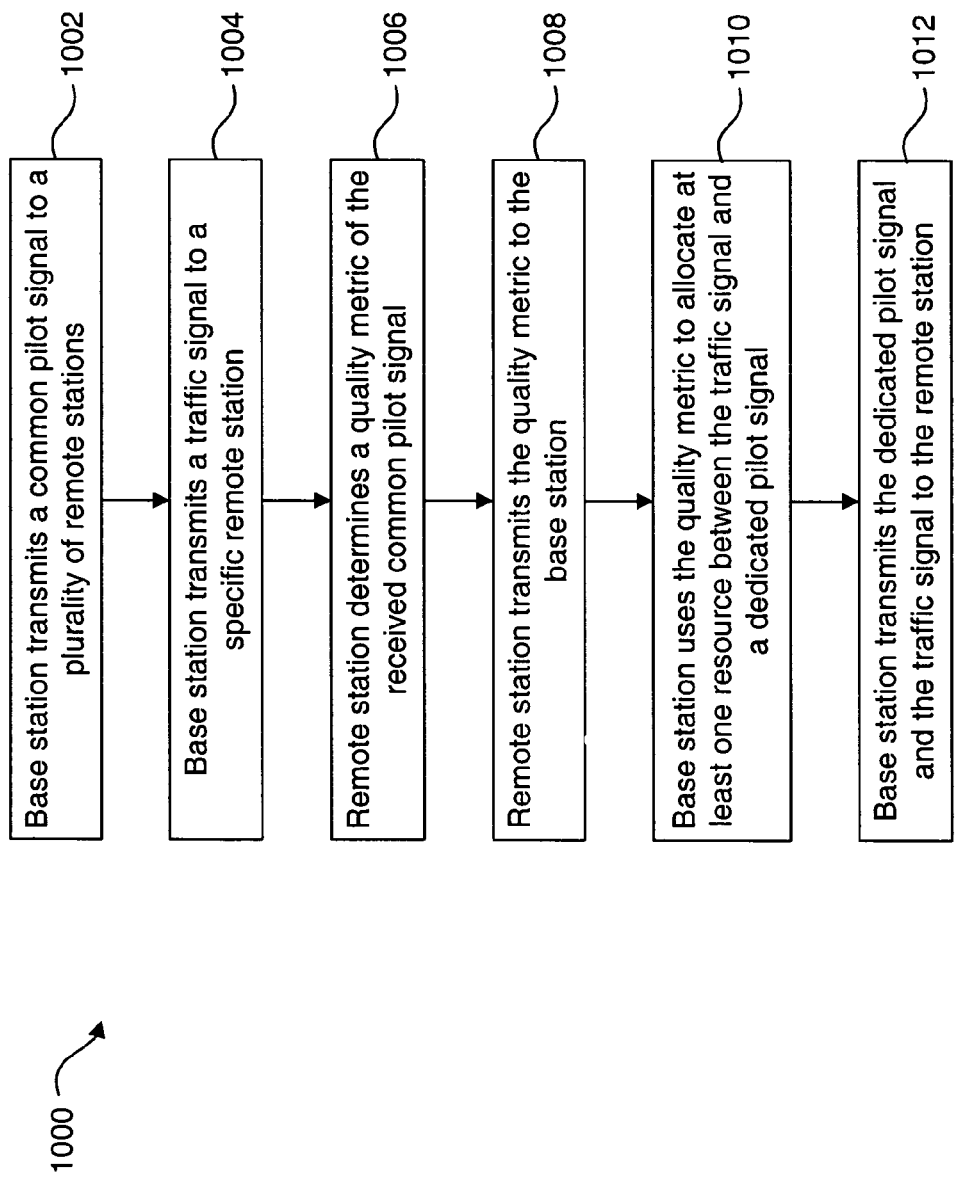
FIG. 10 is a flow diagram illustrating an embodiment of a method for adaptive allocation of resources between a dedicated reference signal and a traffic signal.

FIG. 10 is a flow diagram illustrating an embodiment of a method 1000 for adaptive allocation of resources between a dedicated reference signal 418 and a traffic signal 422. The method 1000 begins when the base station 404 transmits 1002 a common reference signal 414 to a plurality of remote stations 106 in a wireless communication system 100. The base station 404 also transmits 1004 a traffic signal 422 to a specific remote station 106 in the wireless communication system 100.

The remote station 106 determines 1006 a quality metric 432 of the received common reference signal 414'. As discussed previously, the quality metric 432 may be the SINR, the bit error rate, the frame error rate, etc. The remote station 106 transmits 1008 the quality metric 432 to the base station 404. In some embodiments, the remote station 106 may determine 1006 a quality metric 432 and transmit 1008 the quality metric 432 to the base station 404 before the base station 404 transmits 1004 the traffic signal 422 to the remote station 106.

The base station 404 uses the quality metric 432 to allocate 1010 at least one resource between the traffic signal 422 and a dedicated reference signal 418. The base station 404 allocates resources so as to maximize the system capacity for transmitting the traffic signal 422. As discussed previously, examples of resources that may be allocated include power, a time slot in a time-division multiplexed signal, etc. Once resources have been allocated, the base station 404 then transmits 1012 the dedicated reference signal 418 and the traffic signal 422 to the remote station 106.

A mathematical explanation of how the quality metric may be used by the base station to maximize the system capacity for transmitting the traffic signal will now be provided. If we normalize the total amount of resources available at the transmitter of the base station to equal 1, the operation of the system may be described in the following manner. A fixed portion of those resources is constantly devoted to the common reference signal. In each remote station, a training component is constantly using the received common reference signal to train the remote station receiver. Also, in each remote station a quality measurement component is constantly using the received common reference signal to obtain estimates of a quality metric, such as the SMNR. At a given moment in time, the resource allocation component at the base station will allocate another portion p of the available resources to a dedicated channel with the objective of transmitting data to a specific remote station. The problem is how to optimally allocate those p resources between a dedicated reference signal and a traffic signal, such that the data capacity is maximized.

Let us say that there exists a known function g given by equation (1):

$$SINR = g(e_0, p, e_x, \theta, \psi), \quad (1)$$

Equation (1) links the SINR that would be obtained at the remote station receiver during data transmission with the scalar quantities $e_0$, p, $e_x$, and the vectors $\theta$ and $\psi$. The vector $\theta$ describes the type of training algorithms used. The vector $\psi$ represents the (possible) dependence of SINR on the particular channel and interference conditions. More specifically, equation (1) represents the performance of the demodulation technique characterized by $\theta$, when trained over an $e_0$ amount of a common reference signal and an $e_x p$ amount of a dedicated reference signal, applied over a $(1-e_x)p$ amount of resources allocated to a traffic signal.

Let us assume that when there is no traffic signal transmitted to the remote station the quality measurement component of the remote station determines the SINR of the received common reference signal, which is given by another a priori known function $g_p$:

$$SINR_p = g_p(e_0, \theta, \psi) \quad (2)$$

The remote station transmits its measured $SINR_p$ and possibly $\theta$ to the base station.

Since $e_0$ and p are known at the transmitter, if g(.) and $g_p(.)$ are such that knowledge of $SINR_p$ and $\theta$ allows full description of g(.), $e_x$ may be optimized to maximize SINR during periods of data transmission. In most cases, maximizing SINR, also maximizes the data capacity. The particular choice of $e_x$ used for each transmission may be explicitly conveyed to the remote station. For example, in some embodiments, the base station may transmit $e_x$ to the remote station on a dedicated control channel. Alternatively, the base station and the remote station may agree on some implicit rules for determining $e_x$.

A specific example of some of the techniques disclosed herein will now be provided. In the forward link of release C of the cdma2000 cellular standard, a.k.a. 1x-EV-DV, the base station will transmit non-voice (data) traffic over the Packet Data Channel (PDCH). After budgeting power for all the voice users, the remaining forward link power p will be used for the PDCH. A possible mode of operation could be to schedule only one data user at a time, devoting to it the full remaining power p. We now apply some of the techniques described herein to the "single data user" case.

When the receiver employs a least squares estimation method over n pilot chips to compute the coefficients of an L-tap linear equalizer, its average measured $SINR_p$ is given by equation (3) below:

$$SINR_p \approx \frac{e_0}{\frac{1-\alpha}{\alpha}\left(1 + \frac{L-1}{n}\frac{1-e_0 a}{\alpha(1-\alpha)e_0}\right)} \quad (3)$$

In equation (3), the variable $e_0$ is the portion of forward link power allocated to the common reference signal. The variable $\alpha$ is given by equation (4) below:

$$\alpha = Z^H R^{-1} Z \quad (4)$$

If $X_k$ is the L-dimensional input signal vector present at the taps of the linear filter at chip time k, and $Z_k$ is the $k^{th}$ transmitted symbol, then the L-dimensional channel cross-correlation vector is given by equation (5), and the L-by-L signal autocorrelation matrix is given by equation (6):

$$Z = E X_k Z_k^* \quad (5)$$

$$R = E X_k X_k^* \quad (6)$$

In the context of equations (1) and (3) we now identify $\theta$ as given by equation (7), and $\psi$ as given by equation (8):

$$\theta \equiv \frac{L-1}{n} \quad (7)$$

$$\psi \equiv \alpha \quad (8)$$

Accordingly, the vector arguments of $g_p(.)$ and $g_p(.)$ turn out to be scalar quantities. Note the particular simplicity of $\psi$ as it only depends on the quadratic form. It is remarkable that all dependence on channel, interference and noise conditions is gathered by a single parameter $\alpha$.

Let us say that the base station will transmit at a relative power p a frame of n chips of duration over the PDCH, destined to a single data user. One way to embed an auxiliary reference signal is to allocate the first $ne_x$ chips of the dedicated transmission for a training sequence and the remaining $(1-e_x)n$ for data. The remote station receiver would then train its filter over $ne_x$ pilot chips of power $p+e_0$ and $(1-e_x)n$ pilot chips of power $e_0$. It may be shown that under those conditions the average SINR achieved over the dedicated channel of relative power p is given by equation (9):

$$SINR \approx g\left(e_0, e_x, p, \frac{L-1}{n}, \alpha\right) = \frac{p}{\frac{1-\alpha}{\alpha}\left(1 + \frac{L-1}{n}\frac{J_v}{\alpha(1-\alpha)e_v}\right)} \quad (9)$$

The variable $J_v$ is given by equation (10):

$$J_v = \frac{1}{\frac{e_x}{(1-(p+e_0)\alpha)} + \frac{e_0(1-e_x)}{(e_0+p)(1-e_0\alpha)}} \quad (10)$$

The variables $e_v$, $e_0$, and p are related by equation (11):

$$\sqrt{e_v} = \sqrt{e_0 + p} \quad (11)$$

To take into account the fact that only $(1-e_x)$ portion of the frame is used for data transmission, equation (9) is modified into the form of equation (12):

$$SINR \approx \frac{(1-e_x)p}{\frac{1-\alpha}{\alpha}\left(1 + \frac{L-1}{n}\frac{J_v}{\alpha(1-\alpha)e_v}\right)} \quad (12)$$

After examining equations (3) and (12), we realize that if the base station possesses knowledge of $SINR_p$ and $$\frac{L-1}{n}$$

it may use equation (3) to determine $\alpha$, which is the only additional parameter needed in order for it to optimize the choice of $e_x$ that maximizes equation (12). One way to achieve this goal would be for the remote station to send $SINR_p$ and $$\frac{L-1}{n}$$

to the base station through a feedback channel. Alternatively, the parameter $$\frac{L-1}{n}$$

may be a fixed parameter which the base station and remote station agree upon during call setup, and which does not change thereafter.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A base station that adaptively allocates at least one resource between a traffic signal and a dedicated reference signal, comprising:
   means for receiving a quality metric from a remote station, wherein the quality metric indicates the quality of a signal transmitted from the base station in a common reference signal and received by the remote station;
   means for using the quality metric to adaptively allocate a fixed amount of power between the traffic signal and the dedicated reference signal to maximize the capacity for transmitting the traffic signal to the remote station; and
   means for transmitting the dedicated reference signal and the traffic signal to the remote station,
   wherein the received common reference signal and the received dedicated reference signal are used to train a receiver at the remote station.

2. The base station of claim 1, further comprising means for transmitting a common reference signal to the remote station and to a plurality of other remote stations.

3. The base station of claim 2, wherein the quality metric comprises a signal-to-interference-and-noise ratio of the common reference signal received at the remote station.

4. The base station of claim 2, wherein the quality metric comprises a symbol error rate of the common reference signal received at the remote station.

5. The base station of claim 1, further comprising means for transmitting a parameter $e_x$ to the remote station, wherein the parameter $e_x$ represents the portion of the resource allocated to the dedicated reference signal.

6. The base station of claim 1, further comprising means for receiving a parameter θ from the remote station,
   wherein the parameter θ describes a training algorithm used to train a receiver at the remote station to maximize a signal to interference and noise ratio (SINR) during periods of data transmission.

7. Currently Amended) The base station of claim 1, further comprising:
   means for computing the coefficients of an L-tap linear equalizer using a least squares estimation method over n chips of the common reference signal;
   means for receiving a parameter $$\frac{L-1}{n}$$

from the remote station.

8. The base station of claim 1, further comprising:
   means for computing the coefficients of an L-tap linear equalizer using a least square estimation method over n chips of the common reference signal; and
   means for agreeing with the remote station about a fixed value for a parameter $$\frac{L-1}{n}$$

9. A remote station that adaptively allocates at least one resource between a traffic signal and a dedicated reference signal, comprising:
   means for receiving a common reference signal, a dedicated reference signal, and a traffic signal from a base station;
   means for determining a quality metric of the received common reference signal;
   means for transmitting the quality metric to the base station, wherein the base station uses the quality metric to adaptively allocate a fixed amount of power between the dedicated reference signal and the traffic signal to maximize the capacity for transmitting the traffic signal to the remote station; and
   means for using the received common reference signal and the received dedicated reference signal to train a receiver at the remote station.

10. The remote station of claim 9, wherein the quality metric comprises a signal-to-interference-and-noise ratio of the received common reference signal.

11. The remote station of claim 9, wherein the quality metric comprises a symbol error rate of the received common reference signal.

12. The remote station of claim 9, further comprising means for receiving a parameter $e_x$ from the base station, wherein the parameter $e_x$ represents the portion of the resource allocated to the dedicated reference signal.

13. The remote station of claim 9, further comprising means for transmitting a parameter θ to the base station,
   wherein the parameter θ describes a training algorithm used to train the receiver at the remote station to maximize a signal to interference and noise ratio (SINR) during periods of data transmission.

14. The remote station of claim 9, further comprising:
means for computing the coefficients of an L-tap linear equalizer using a least squares estimation method over n chips of the common reference signal; and
means for transmitting a parameter $$\frac{L-1}{n}$$

to the base station.

15. The remote station of claim 9, further comprising:
means for computing the coefficients of an L-tap linear equalizer using a least square estimation method over n chips of the common reference signal; and
means for agreeing with the base station about a fixed value for a parameter $$\frac{L-1}{n}.$$

16. A base station that adaptively allocates at least one resource between a traffic signal and a dedicated reference signal, comprising:
a receiver that receives a quality metric from a remote station, wherein the quality metric indicates the quality of a signal transmitted from the base station in a common reference signal and received by the remote station;
a resource allocation component that uses the quality metric to adaptively allocate a fixed amount of power between the traffic signal and the dedicated reference signal to maximize the capacity for transmitting the traffic signal to the remote station; and
a transmitter that transmits the traffic signal and the dedicated reference signal to the remote station,
wherein the received common reference signal and the received dedicated reference signal are used to train a receiver at the remote station.

17. The base station of claim 16, wherein the transmitter also transmits a parameter $e_x$ to the remote station, wherein the parameter $e_x$ represents the portion of the resource allocated to the dedicated reference signal.

18. The base station of claim 16, wherein the receiver also receives a parameter θ from the remote station,
wherein the parameter θ describes a training algorithm used to train a receiver at the remote station to maximize a signal to interference and noise ratio (SINR) during periods of data transmission.

19. The base station of claim 16, wherein a training component at the remote station employs a least squares estimation method over n chips of the common reference signal to compute the coefficients of an L-tap linear equalizer, and wherein the receiver also receives a parameter $$\frac{L-1}{n}$$

from the remote station.

20. The base station of claim 16, wherein a training component at the remote station employs a least squares estimation method over n chips of the common reference signal to compute the coefficients of an L-tap linear equalizer, and wherein the base station is configured to agree with the remote station about a fixed value for a parameter $$\frac{L-1}{n}.$$

21. The base station of claim 16, wherein the transmitter is further configured to transmit a common reference signal to the remote station and to a plurality of other remote stations.

22. The base station of claim 21, wherein the quality metric comprises a signal-to-interference-and-noise ratio of the common reference signal received at the remote station.

23. The base station of claim 21, wherein the quality metric comprises a symbol error rate of the common reference signal received at the remote station.

24. A remote station configured to facilitate adaptive allocation of at least one resource between a traffic signal and a dedicated reference signal, the remote station comprising:
a receiver that receives a common reference signal, a dedicated reference signal, and a traffic signal from a base station;
a signal quality measurement component that determines a quality metric of the received common reference signal;
a transmitter that transmits the quality metric to the base station, wherein the base station uses the quality metric to adaptively allocate a fixed amount of power between the dedicated reference signal and the traffic signal to maximize the capacity to transmit the traffic signal to the remote station; and
a training component that uses the received common reference signal and the received dedicated reference signal to train the receiver.

25. The remote station of claim 24, wherein the quality metric comprises a signal-to-interference-and-noise ratio of the received common reference signal.

26. The remote station of claim 24, wherein the quality metric comprises a symbol error rate of the received common reference signal.

27. The remote station of claim 24, wherein the receiver also receives a parameter $e_x$ from the base station, wherein the parameter $e_x$ represents the portion of the resource allocated to the dedicated reference signal.

28. The remote station of claim 24, wherein the transmitter also transmits a parameter θ to the base station,
wherein the parameter θ describes a training algorithm used by the training component to train the receiver at the remote station to maximize a signal to interference and noise ratio (SINR) during periods of data transmission.

29. The remote station of claim 24, wherein the training component uses a least squares estimation method over n chips of the common reference signal to compute the coefficients of an L-tap linear equalizer, and wherein the transmitter also transmits a parameter $$\frac{L-1}{n}$$

to the base station.

30. The remote station of claim 16, wherein the training component uses a least squares estimation method over n chips of the common reference signal to compute the coefficients of an L-tap linear equalizer, and wherein the remote station is configured to agree with the base station about a fixed value for a parameter $$\frac{L-1}{n}.$$

31. In a base station, a method for adaptively allocating at least one resource between a traffic signal and a dedicated reference signal, comprising:

receiving a quality metric from a remote station, wherein the quality metric indicates the quality of a signal transmitted from the base station in a common reference signal and received by the remote station;

using the quality metric to adaptively allocate a fixed amount of power between the traffic signal and the dedicated reference signal to maximize the capacity for transmitting the traffic signal to the remote station; and transmitting the dedicated reference signal and the traffic signal to the remote station, wherein the received common reference signal and the received dedicated reference signal are used to train a receiver at the remote station.

32. In a remote station, a method for facilitating adaptive allocation of at least one resource between a traffic signal and a dedicated reference signal, comprising:

receiving a common reference signal, a dedicated reference signal, and a traffic signal from a base station;

determining a quality metric of the received common reference signal;

transmitting the quality metric to the base station, wherein the base station uses the quality metric to adaptively allocate a fixed amount of power between the dedicated reference signal and the traffic signal to maximize the capacity for transmitting the traffic signal to the remote station; and using the received common reference signal and the received dedicated reference signal to train a receiver at the remote station.

* * * * *